May 18, 1937.　　　　H. A. BAKKE　　　　2,081,115

RATCHET MECHANISM

Filed Aug. 12, 1936

Inventor:
Hans A. Bakke,
by Harry E. Dunham
His Attorney.

Patented May 18, 1937

2,081,115

UNITED STATES PATENT OFFICE 2,081,115

RATCHET MECHANISM

Hans A. Bakke, Swampscott, Mass., assignor to General Electric Company, a corporation of New York Application August 12, 1936, Serial No. 95,575

7 Claims. (Cl. 188—81)

My invention relates to a ratchet mechanism particularly designed for use on electric integrating meters to prevent rotation in a backward direction, and the objects of my invention are to provide a ratchet and pawl which produces a minimum of friction when the meter is operating in a forward direction, is substantially noiseless in operation, requires only half the number of teeth in the ratchet wheel as is required in the usual type of ratchet for the same effectiveness, is positive in its action, and automatically maintains its pawl in an operative condition as contrasted with the usual type of pawl which may eventually fail to move into operative position due to a gradual collection of dirt or to corrosion.

The features of my invention which are believed to be novel and patentable will be pointed out in the claims appended hereto. For a better understanding of my invention, reference is made in the following description to the accompanying drawing wherein Fig. 1 represents a side view of my improved ratchet mechanism as applied to the top bearing of an integrating meter to prevent backward rotation of the meter shaft, and Fig. 2 is a perspective top view of the double-toothed ratchet pawl employed in my ratchet mechanism.

Figure 1:
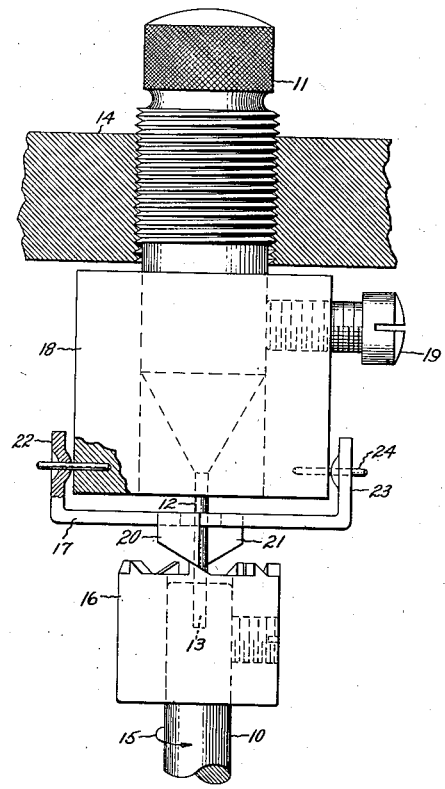
Figure 2:
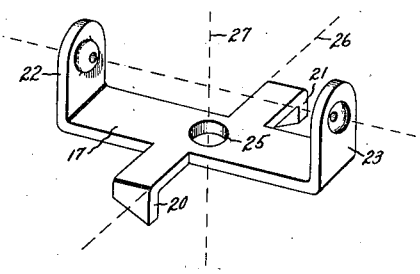

In Fig. 1, 10 may represent the upper end of a rotary shaft, such as the shaft of an integrating meter. It is provided with a guide bearing member 11 having a central pin 12 extending into a central bore 13 in the upper end of shaft 10. The guide bearing member is supported in framework, a portion of which is shown at 14.

Certain integrating meters, for example, watt-hour meters, which are used to measure the electric power flowing in a tie line, will reverse their direction of rotation if the direction of power flow in the tie line reverses. In such a case, where it is desired to measure the power flow in a given direction, the meter should be provided with means, for example, a pawl and ratchet, to prevent it from rotating in a backward direction. Fig. 1 may represent the top bearing arrangement of such a meter in which the desired forward direction of rotation of the meter is indicated by the arrow 15 and it is necessary to prevent the reverse rotation in order to obtain the measurement desired.

My improved ratchet mechanism is used to accomplish the desired results. It consists of the ratchet wheel 16 is secured on the upper end of shaft 10 with its odd number of ratchet teeth (seven in this instance) cut in the upper surface and a double-ended ratchet pawl 17 pivoted to a stationary support, such as the bushing 18, fastened to the upper bearing member 11 by a set screw 19.

The pawl structure is in the general shape of a cross with downwardly projecting teeth 20 and 21 on the ends of oppositely extending arms and with turned-up pivot ears 22 and 23 on the outer ends of the other arms. The pawl is so mounted by means of pivot pins 24 that the two teeth 20 and 21 cooperate with the toothed surface of ratchet 16 on opposite or approximately opposite diameters thereof, and the pawl is pivoted on a central horizontal axis midway between the teeth 20 and 21. Where, as here, it is necessary to provide room for the central pivot pin 13 of the meter bearing, a central opening 25 is provided therefor in the pawl structure.

It is seen that the pawl may tilt about its horizontal pivot to cause one tooth 20 to move upward while the other tooth 21 moves downward the same distance and vice versa. The pawl is positioned above the ratchet 16 such a distance that, as one tooth of the pawl drops down to rest in the bottom of a slot between teeth in ratchet 16, the opposite tooth of the pawl will rise to clear the upper point of the teeth in the opposite side of ratchet 16. The long front edge of teeth 20 and 21 are on a line 26 (Fig. 2) through the central axis 27 of the assembly, and the number of teeth in ratchet 16 is odd so that, when tooth 20 is opposite a slot in ratchet 16, tooth 21 is opposite a tooth in the opposite side of the ratchet and vice versa. It is not essential that the number of teeth in ratchet 16 be odd and that the pawl teeth be exactly on a line through the axis 27. It is not possible for both teeth 20 and 21 to be raised a sufficient distance at the same time to clear the teeth on both sides of ratchet 16. This is evident from Fig. 1 where the pawl is shown in a level position. It is, however, possible, due to the staggered arrangement of the teeth in the ratchet and in the pawl at opposite sides, for tooth 20 to clear a ratchet tooth opposite thereto on the near side of the ratchet when tooth 21 is in a depression or slot between ratchet teeth on the far side of the ratchet.

The pawl is freely pivoted and is evenly balanced on its pivoted axis when in the level position shown in Fig. 1. This balance is not appreciably disturbed by the slight tilt necessary for a tooth of the pawl to clear a tooth in the ratchet.

Assume now that shaft 10 with its ratchet 16 is rotated in the forward direction, as indicated by arrow 15. Pawl tooth 20 will rise slightly, tilting the pawl accordingly, until the contacting teeth clear. The next occurrence will be a similar action between tooth 21 of the pawl and a ratchet tooth, causing the pawl to tilt in the opposite direction. Then this will occur at tooth 20 again and so on so long as the shaft 10 continues to rotate in a forward direction. It is evident now that a negligible amount of energy is taken from the rotating shaft 10 to produce this tilting action of the pawl 17 because the pawl has very little mass, is freely pivoted, and is substantially balanced. The energy required here is very much less than that required to lift the ordinary ratchet pawl over a tooth. It is also evident that the tilting operation above described will be accompanied by little, if any, noise if the ratchet is properly designed and proportioned with relation to the usual meter speed, because the pawl teeth do not drop by gravity or spring pressure behind the ratchet teeth, as in the usual pawl and ratchet device, to click in the bottom of a depression but rather the pawl remains in the tilted position until it is tilted in the opposite direction by the cam action of the sloping surfaces of the next tooth to contact or, if it tends to tilt back to a level position, it does not tilt far enough to produce a click.

If now the shaft reverses, it will be positively checked by one pawl tooth or the other since one or both of these teeth must be in checking position in the line of travel of the teeth in the ratchet wheel. Although the ratchet has only seven teeth, the maximum amount of backward rotation permitted is one-fourteenth revolution because the mechanism with its double-toothed pawl arrangement staggered with respect to the teeth in the ratchet is equivalent to a usual pawl and a fourteen-toothed ratchet. The slope of the teeth is such as to permit rotation in one direction only.

The usual pawl and ratchet device sometimes fails to function because of the collection of dirt or the corroding of the parts which causes sticking and prevents the free fall of the pawl behind the ratchet teeth into locking position. This is generally a gradual occurrence where the fall of the pawl becomes less and less until finally it sticks in an inoperative position. This is prevented in my improved ratchet because one pawl at least must always be in checking position and a sticky condition, due to a gradual collection of dirt, is not likely to occur unless the meter is stopped for a long period of time because, when it is in operation, the pawl must tilt back and forth and it thus automatically keeps itself in a free operating condition.

In the illustration described, the ratchet wheel has its axis of rotation vertical and its tooth surface on the upper end with the pawl above it. It will, however, be evident that my improved ratchet mechanism will operate satisfactorily in any other oriented position because the tilting operation of the pawl does not depend upon gravity. The pawl may be pivoted on its exact center of gravity on any axis and still operate satisfactorily because it is tilted back and forth by reason of contact with the teeth in the ratchet wheel when there is relative rotation in the direction permitted.

In general, minimum friction and noise occurs when the pawl is of small mass and is pivoted so as to be balanced or nearly balanced over its small range of travel. Where the elimination of noise or friction is important, it may be helpful to pivot the pawl slightly above the center of gravity but on a vertical line therewith when the pawl is in a midposition. In the illustration, the pawl is pivoted slightly above its center of gravity and will, therefore, naturally seek a position due to gravity where it hangs balanced in a level position, which appears to be helpful in reducing noise and friction to a minimum with the number of ratchet-wheel teeth shown for average watt-hour meter speeds of rotation. If, now, the rate of oscillation of the pawl could be made the same as its natural rate of oscillation as a pendulum, it is believed that we would have reached the ideal condition as far as eliminating noise and friction is concerned. This is, of course, not always possible where the shaft 10 rotates at different speeds but the principle may serve as a guide in approaching the best design in any particular case. For instance, if the device with a given pawl and with seven teeth in the ratchet wheel performs best for an average speed of thirty revolutions per minute, a ratchet wheel with eleven teeth would be best for an average speed of twenty revolutions per minute.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A ratchet mechanism comprising, a ratchet wheel having a number of evenly spaced teeth about one side of its periphery, and a double-ended pawl having teeth on opposite ends and spaced from the side of said ratchet wheel such that the teeth of the pawl may cooperate with the teeth of the ratchet wheel on approximately opposite diameters thereof, said pawl being pivoted at the center so as to be tipped back and forth to bring the teeth on opposite ends thereof alternately into and out of ratcheting relation with said ratchet wheel, said pawl and wheel being relatively rotatable about the axis of said wheel.

2. A ratchet mechanism comprising, a ratchet wheel having an odd number of evenly spaced teeth about one side of its periphery, and a double-ended pawl having teeth on opposite ends thereof facing the toothed surface of the wheel on opposite diameters thereof, said pawl being freely pivoted at its center and spaced from said wheel such that it may be tipped back and forth to bring the teeth on opposite ends thereof alternately into and out of ratcheting relation with said ratchet wheel, the spacing being insufficient, however, to permit bringing both teeth of the pawl out of ratcheting relation with said wheel simultaneously, said wheel and pawl being relatively rotatable about the axis of the wheel.

3. A ratchet mechanism comprising, a ratchet wheel having an odd number of evenly spaced teeth about one side near its periphery, and a double-ended pawl spaced from said wheel and having teeth on opposite ends facing the tooth surface of said wheel on opposite diameters thereof, said pawl being freely pivoted at its center to permit the teeth on opposite ends thereof alternately to be brought into and out of ratcheting relation with said ratchet wheel, the extent of such tilt being limited by reason of contact between the toothed surfaces of said parts, the spacing between said parts being such that, when the pawl is in a midposition, the teeth on both ends thereof intercept a circle through the outer ends of the teeth on the ratchet wheel, said pawl and ratchet wheel being relatively rotatable about the axis of the wheel and having their teeth sloped to permit relative rotation in one direction only.

4. A ratchet mechanism comprising, a ratchet wheel mounted for rotation about a vertical axis and having a number of ratchet teeth evenly spaced about its upper end surface, and a double-ended pawl pivoted at its center on a horizontal axis spaced from and extending approximately across the upper diameter of said wheel and having downwardly extending teeth in its two ends for cooperation with the teeth in the ratchet wheel on approximately opposite diameters thereof, the arrangement being such that, when the ratchet wheel is rotated in one direction, its teeth alternately engage the teeth on opposite ends of the pawl and tilt the pawl back and forth on its pivot and, when the wheel is attempted to be rotated in the opposite direction, it is prevented from doing so by the checking action of the pawl, which checking action may occur at either end of the pawl.

5. A ratchet mechanism comprising, a ratchet wheel rotatively mounted on a vertical axis with its ratchet teeth about its upper end surface, there being an odd number of such teeth evenly spaced in a circle, and a ratchet pawl cooperating therewith comprising, a member in the general shape of a cross spaced above the ratchet wheel, opposite arms of the cross having upwardly extending projections by means of which the pawl is pivoted on a horizontal axis intersecting the vertical axis of rotation of the ratchet wheel, the remaining arms of the cross having downwardly extending teeth at their ends opposite the toothed surface of the ratchet wheel on opposite diameters thereof, the spacing between the ratchet and pawl being such that the pawl may tilt back and forth on its pivot to the extent necessary for its teeth to alternately clear the teeth in the ratchet wheel on opposite diameters thereof as the ratchet wheel is rotated and will be in a position to intercept teeth in the ratchet wheel at both ends when in a midtilt position.

6. A ratchet mechanism comprising, a ratchet wheel with its ratchet teeth in an end wall thereof, a double-ended pawl spaced from the toothed surface of said wheel and having pawl teeth opposite the toothed surface of said wheel on approximately opposite diameters thereof and with one pawl tooth opposite a slot in the ratchet wheel when the other pawl tooth is opposite a tooth in the ratchet wheel, and means for pivoting said pawl at its center on an axis parallel with the toothed face of said ratchet wheel, the spacing between the pawl and wheel being such that the pawl may tilt back and forth on its pivot to bring its teeth alternately into and out of ratcheting position with respect to said ratchet wheel on approximately opposite diameters thereof.

7. A ratchet mechanism for use in connection with integrating meters to prevent backward rotation thereof comprising, a ratchet wheel and a double-toothed pawl, the pawl having teeth for contacting the ratchet wheel on approximately opposite diameters thereof, the pawl having a freely movable range of travel in such manner and to such extent that, as one of its teeth moves into contacting position on one side of said wheel, the other tooth moves out of contacting position on the opposite side of said wheel and vice versa, and being so positioned relative to the ratchet wheel that, when one of its teeth is opposite a slot in the ratchet wheel, the other tooth is opposite a tooth in the ratchet wheel and vice versa, and, when in the center of its range of travel, both of its teeth are in the line of travel of the teeth in the ratchet wheel, the slope of the teeth in ratchet wheel and pawl being such as to permit of relative rotation between the pawl and ratchet wheel in one direction only.

HANS A. BAKKE.